(12) United States Patent
Clingerman et al.

(10) Patent No.: US 8,955,820 B2
(45) Date of Patent: Feb. 17, 2015

(54) ICE BREAKING ANODE VALVE

(75) Inventors: Bruce J. Clingerman, North Rose, NY (US); Aaron Rogahn, Rochester, NY (US); James K. Leary, Rochester, NY (US); Seth E. Lerner, Honeoye Falls, NY (US); Michael J. Muller, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 482 days.

(21) Appl. No.: 13/175,981

(22) Filed: Jul. 5, 2011

(65) Prior Publication Data

US 2013/0009082 A1 Jan. 10, 2013

(51) Int. Cl.
*H01M 8/04* (2006.01)

(52) U.S. Cl.
CPC ............ *H01M 8/04089* (2013.01); *Y02E 60/50* (2013.01); *Y10S 251/903* (2013.01)
USPC ....... 251/122; 251/123; 251/129.16; 251/903

(58) Field of Classification Search
USPC .................... 251/120–123, 339, 903, 129.16; 137/301
See application file for complete search history.

(56) References Cited

U.S. PATENT DOCUMENTS

| | | | | |
|---|---|---|---|---|
| 1,894,505 A | * | 1/1933 | Westerman et al. | 251/120 |
| 2,331,503 A | * | 10/1943 | Ray | 251/80 |
| 2,364,107 A | * | 12/1944 | Svirsky | 251/120 |
| 3,190,608 A | * | 6/1965 | Hassa | 251/121 |
| 3,570,521 A | * | 3/1971 | Kirschenman | 137/113 |
| 3,685,533 A | * | 8/1972 | Krechel | 137/115.05 |
| 3,807,689 A | * | 4/1974 | Booth | 251/238 |
| 3,913,609 A | * | 10/1975 | Remane | 137/322 |
| 4,388,835 A | * | 6/1983 | Rosaen | 73/861.58 |
| 4,969,628 A | * | 11/1990 | Reich et al. | 251/122 |
| 5,419,531 A | * | 5/1995 | Hoehn | 251/122 |

* cited by examiner

*Primary Examiner* — Eric Keasel
(74) *Attorney, Agent, or Firm* — Fraser Clemens Martin & Miller LLC; James D. Miller

(57) ABSTRACT

A valve for a fuel cell system includes a valve housing having a valve seat formed therein. The valve seat includes an orifice formed therein to permit a fluid to flow through the valve housing. A movable member is disposed in the valve housing and is movable between an open position and a closed position. The movable member includes a first end having an elongate portion and a generally conical shaped base. At least a portion of the base is disposed in the orifice of the valve seat when the movable member is in the closed position to militate against a formation of ice across the orifice of the valve seat.

17 Claims, 2 Drawing Sheets

ICE BREAKING ANODE VALVE

FIELD OF THE INVENTION

The disclosure relates to an anode valve and, more particularly, to an anode valve for a fuel cell system.

BACKGROUND OF THE INVENTION

A fuel cell system is an electro-chemical device that includes an anode and a cathode with an electrolyte therebetween. The anode receives a fuel such as hydrogen and the cathode receives an oxidant such as oxygen or air. When the fuel is supplied to a reaction plane of the anode via an anode loop, the fuel is ionized and the fuel ions are transferred to the cathode via a solid polymer electrolyte membrane. During this process, electrons are generated and flow, either through a bipolar plate to an adjacent cell, or to an external circuit, providing direct current electric energy. As the oxidant is supplied to the cathode via a cathode loop, the fuel ions, electrons, and the oxidant react at the cathode and produce water. The water is exhausted from the fuel cell system by means of a cathode exhaust passage. Typically, not all of the water is exhausted from the fuel cell system.

Valves are typically disposed in the anode loop to control various flows and parameters of the fuel such as a pressure and temperature of the fuel within the fuel cell system, for example. One such anode valve controls a flow of the fuel to the cathode for warm-up of the fuel cell system in a low-temperature environment. If water remains in the anode loop after shutoff of the fuel cell system and the fuel cell system is maintained in the low-temperature environment, the water remaining in the anode valve may freeze and form ice. The ice may form a blockage in the anode valve and prevent normal operation of the anode valve. When the anode valve is not operating normally, it may be difficult to restart the fuel cell system, which is undesirable.

It would be desirable to produce an anode valve for a fuel cell system including a movable member to militate against ice blockage, wherein an energy and a time required to bring the anode valve to a normal operating condition are minimized.

SUMMARY OF THE INVENTION

In concordance and agreement with the present invention, an anode valve for a fuel cell system including a movable member to militate against ice blockage, wherein an energy and a time required to bring the anode valve to a normal operating condition are minimized, has been surprisingly discovered.

In one embodiment, a valve for a fuel cell system comprises: a valve housing including a valve seat formed therein, the valve seat having an orifice formed therein to permit a fluid to flow through the valve housing; and a movable member disposed in the valve housing and linearly movable between an open position and a closed position, wherein at least a portion of the movable member is disposed in the orifice to militate against a formation of ice across the orifice of the valve seat when the movable member is in the closed position.

In another embodiment, a valve for a fuel cell system comprises: a valve housing including a valve seat formed therein, the valve seat having an orifice formed therein to permit a fluid to flow through the valve housing; and a movable member disposed in the valve housing and movable between an open position and a closed position, the movable member including a first end, a second end, and a collar disposed intermediate the first end and the second end, the first end having a base, wherein at least a portion of the base is disposed in the orifice of the valve seat when the movable member is in the closed position, and wherein a fluid tight seal is formed between the collar and the valve seat when the movable member is in the closed position.

In another embodiment, a valve for a fuel cell system comprises: a valve housing including a valve seat formed therein, the valve seat having an orifice formed therein to permit a fluid to flow through the valve housing; and a movable member disposed in the valve housing and linearly movable between an open position and a closed position, the movable member including a first end, a second end, and a collar disposed intermediate the first end and the second end, the first end having an elongate portion and a generally conical shaped base, wherein the base is positioned away from the orifice of the valve seat when the movable member is in the open position so as to not interfere with a flow of the fluid through the orifice, and at least a portion of the base is disposed in the orifice of the valve seat when the movable member is in the closed position to militate against a formation of ice across the orifice of the valve seat, and wherein a fluid tight seal is formed between the collar and the valve seat when the movable member is in the closed position.

BRIEF DESCRIPTION OF THE DRAWINGS

The above, as well as other advantages of the present disclosure, will become readily apparent to those skilled in the art from the following detailed description, particularly when considered in the light of the drawings described hereafter.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner.

Figure 1:
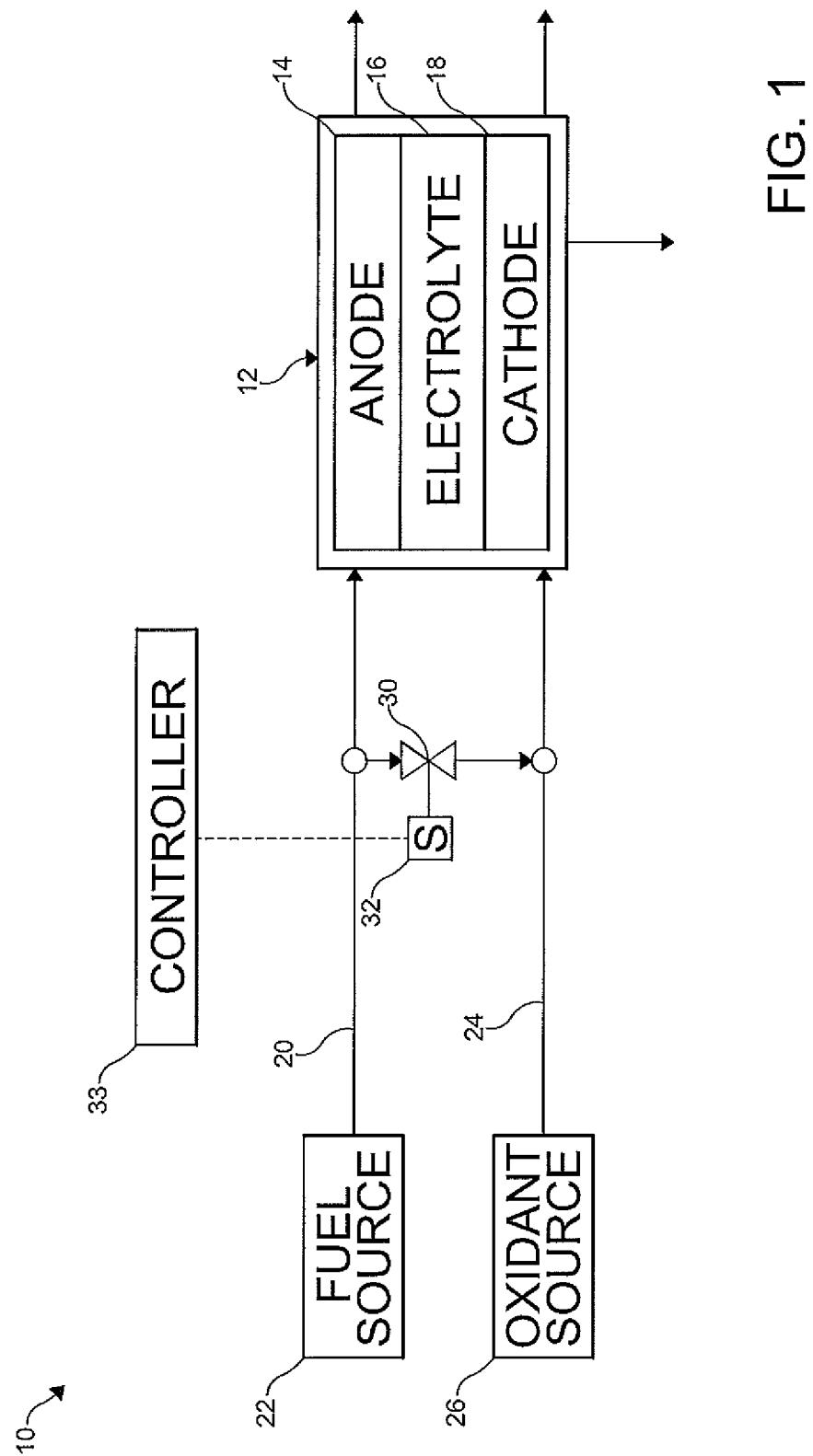
FIG. 1 is a schematic flow diagram of a fuel cell system including an anode valve of the present invention.

In FIG. 1, a fuel cell system 10 of the type in which the present invention may be practiced is shown generically, in a simplified form. Although a single fuel cell 12 is shown, the fuel cell system 10 can have many fuel cells 12 disposed adjacent to each other so as to form a stack. The fuel cell 12 includes an electrolyte 16 such as a polymeric electrolyte proton exchange membrane, having two major surfaces adjacent to which are an anode 14 and a cathode 18. Fuel (e.g. hydrogen) is fed via an anode loop 20 to the anode 14 in gaseous form from a fuel source 22, and an oxidant (e.g. oxygen or air) is supplied via a cathode loop 24 to the cathode 18 from an oxygen source 26. In accordance with the invention, in a low-temperature environment, the fuel is passed through an anode valve 30, operated by a solenoid 32, to mix with the oxidant to provide a dilute fuel/oxidant mixture to the cathode 18 to warm-up the fuel cell 12. Typically, a controller 33 controls the solenoid 32 to open the valve 30 when the vehicle is to be started and controls the solenoid 32 to close the valve 30 to avoid overheating of the cathode 18. Although the valve 30 described hereinafter is for use in the anode loop 20 of the fuel cell system 10, it is understood that the valve 30 can also be employed in the cathode loop 24 if desired.

As illustrated in FIGS. 2-5, the valve 30 includes a valve housing 34. The valve housing 34 is supplied with the fuel through an inlet end 36 and the fuel is discharged from the valve housing 34 through an outlet end 38. The outlet end 38 shown includes a pair of discharge apertures 39 formed therein. It is understood, however, that the outlet end 38 can have fewer or additional discharge apertures 39 than shown, if desired. As shown, the valve housing 34 is provided with a first sealing member 41 and a second sealing member 43. The first sealing member 41 is disposed around an outer periphery of the inlet end 36 of the valve housing 34 to militate against a leakage of the fuel from the inlet end 36 to the outlet end 38. The second sealing member 43 is disposed around an outer periphery of the outlet end 38 of the valve housing 34 to militate against a leakage of the fuel from the outlet end 38 to the atmosphere. Additional or fewer sealing members than shown can be employed, if desired.

A valve seat 40 is formed in the valve housing 34. The valve seat 40 includes a central orifice 42 formed therein to permit a flow of the fuel through the valve 30. A movable member 44 is axially, displaceably disposed in the valve housing 34 to selectively open and close the valve 30. The movable member 44 shown has a generally circular cross-sectional shape and includes a first end 46 and a second end 47. A generally circular collar 48 is formed intermediate the first end 46 and the second end 47.

Figures 2, 3:
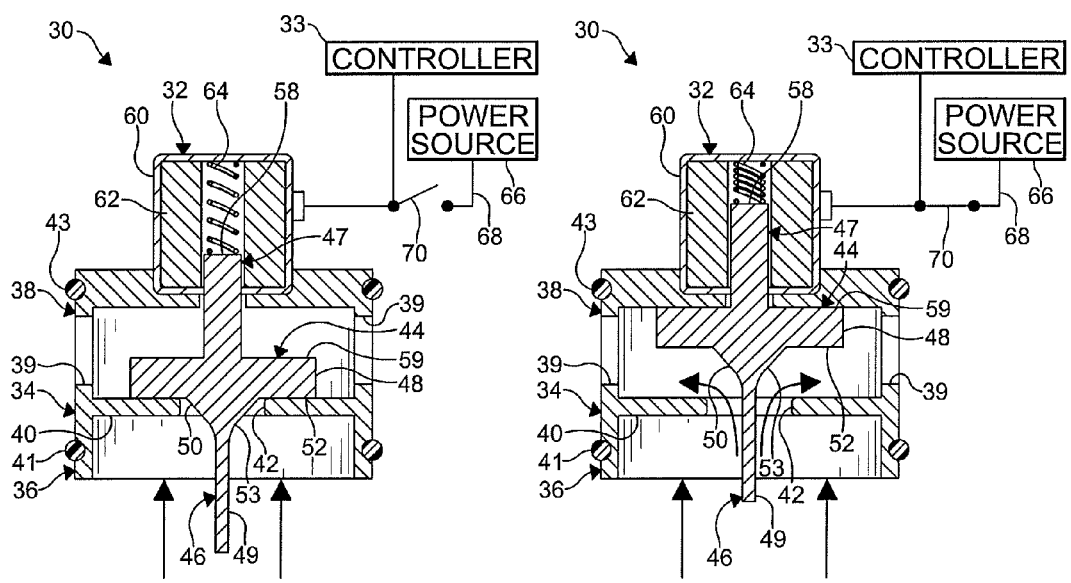
FIG. 2 is a schematic, fragmentary, cross-sectional view of the anode valve according to an embodiment of the present invention, showing a movable member of the anode valve in a closed position.
FIG. 3 is a schematic, fragmentary, cross-sectional view of the anode valve illustrated in FIG. 2, showing the movable member of the anode valve in an open position.
Figures 4, 5:
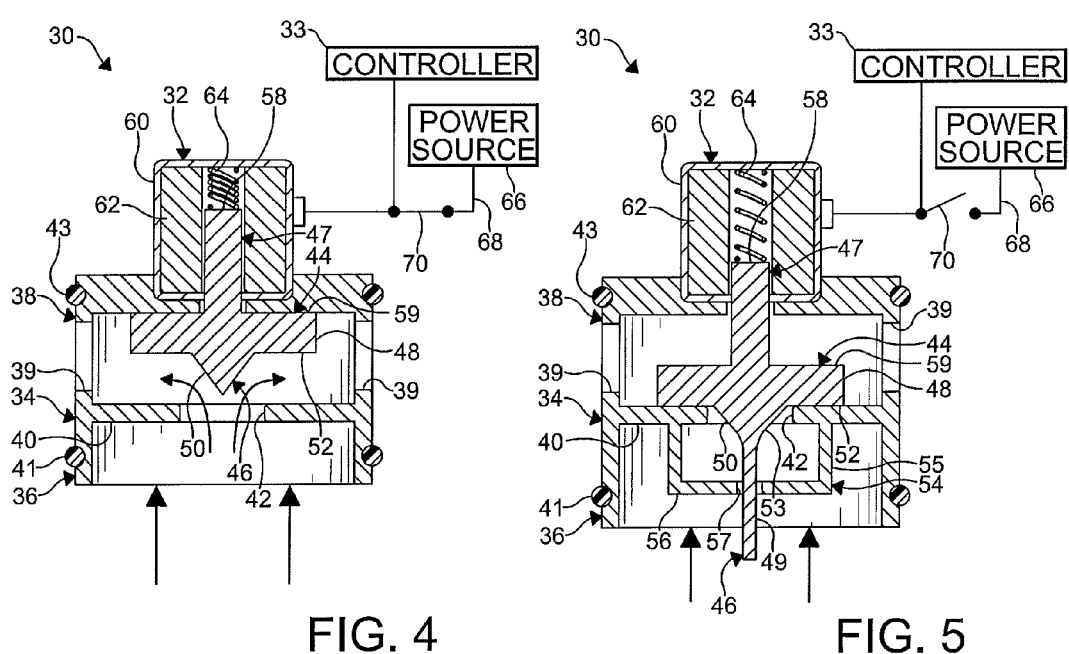
FIG. 4 is a schematic, fragmentary, cross-sectional view of the anode valve illustrated in FIGS. 2-3, showing an alternative movable member of the anode valve in an open position.
FIG. 5 is a schematic, fragmentary, cross-sectional view of the anode valve illustrated in FIGS. 2-4 showing a bearing bracket employed to facilitate alignment of the movable member.

As shown in FIGS. 2-3, the first end 46 includes a rod-shaped elongate portion 49 and a generally conical shaped base 50. It is understood, however, that the first end 46 can be formed without the elongate portion 49, as shown in FIG. 4, if desired. A diameter of the base 50 gradually increases from the elongate portion 49 to a first surface 52 of the collar 48. As shown in FIG. 2, the diameter of the base 50 is less than the diameter of the orifice 42 formed in the valve seat 40, permitting at least a portion of the base 50 to be disposed in the orifice 42 when the valve 30 is closed. When the valve 30 is open, as shown in FIG. 3, the base 50 is positioned away from the orifice 42 so as to not interfere with a flow of the fuel through the orifice 42. Accordingly, the base 50 does not affect a desired effective flow factor ($K_v$) of the valve 30. In a non-limiting example, the base 50 is formed from a softer material than the valve seat 40. Thus, if the base 50 frequently contacts the valve seat 40 during an opening and closing of the valve 30, a wearing of the base 50 occurs before a wearing of the valve seat 40. Because the base 50 does not affect the desired effective flow factor $K_v$ of the valve 30, the wearing of the base 50 does not interfere with an operation of the valve 30. A transition 53 between the base 50 and the elongate portion 49, as well as an edge of the valve seat 40 adjacent the orifice 42 are curved to facilitate slideable contact between the movable member 44 and the valve seat 40 when opening and closing the valve 30.

A diameter of the elongate portion 49 is proportional to the diameter of the orifice 42 to obtain the desired effective flow factor $K_v$ of the valve 30 when the valve 30 is open. For example, if the diameter of the elongate portion 49 is increased to militate against a breakage thereof, a diameter of the orifice 42 is also increased to maintain the desired effective flow factor $K_v$. As shown, a length of the elongate portion 49 is such that a portion thereof remains in the orifice 42 when the movable member 44 is in the open position to maintain alignment of the movable member 44.

As shown in FIG. 5, a bearing bracket 54 can be, integrally or separately, formed with the valve seat 40, The bearing bracket 54 provides additional support and alignment of the elongate portion 49 and limits a degree of tilt or lateral movement of the movable member 44. By limiting the degree of tilt or lateral movement of the movable member 44, the bearing bracket 54 also limits an effect that the tilt or lateral movement of the movable member 44 has on the desired effective flow factor $K_v$ of the valve 30. In a non-limiting example, the bearing bracket 54 includes a pair of spaced apart support arms 55 having a cross-member 56 disposed therebetween. The cross-member 56 includes an aperture 57 formed therein to receive the elongate portion 49 therethrough. The elongate member 49 contacts an inner surface of the aperture 57 when a maximum allowable degree of tilt or lateral movement of the movable member 44 is reached.

The second end 47 has a generally uniform diameter from an outer edge 58 thereof to a second surface 59 of the collar 48. It is understood, however, that the first and second ends 46, 47 can have any shape and size as desired. At least a distal portion of the second end 47 is produced from a magnetic metallic material such as stainless steel, for example. It is understood that the entire second end 47 or movable member 44 can be formed from the magnetic metallic material if desired. The second end 47 is operatively coupled to the solenoid 32 for selectively positioning the movable member 44 between a closed position, as shown in FIG. 2, and an open position, as shown in FIG. 3.

The solenoid 32 includes a solenoid housing 60 having a coil 62 disposed therein. The coil 62 is disposed around the second end 47. A return mechanism 64 is interposed between the second end 47 and the solenoid housing 60. The return mechanism 64 biases the movable member 44 to be displaced toward the valve seat 40 of the valve housing 34 to close the valve 30. In a non-limiting example, a fluid-tight seal is formed between the movable member 44 and the valve seat 40 when the valve 30 is closed. As illustrated, the solenoid 32 is in electrical communication with a power source 66. The power source 66 supplies electrical current through an electrical path 68 to the solenoid 32 for energizing the coil 62. A switch 70 may be disposed in the electrical path 68 to permit or interrupt a flow of the electrical current from the power source 66. As shown, the switch 70 is opened and closed by the controller 33 of the fuel cell system 10.

Operation of the valve 30 is described hereinafter. When the switch 70 is opened by the controller 33 of the fuel cell system 10, as shown in FIGS. 2 and 5, the flow of the electrical current from the power source 66 is interrupted. Accordingly, the coil 62 is not energized and the return mechanism 64 biases the movable member 44 towards the valve seat 40 of the valve 30. In particular, a resilient force of the return mechanism 64 overcomes a pressure of the fuel in the inlet end 36 of the valve 30, maintaining a closed position of the movable member 44. Thus, the collar 48 of the movable member 44 abuts the valve seat 40 of the valve 30, forming a fluid-tight seal therebetween. Further, at least a portion of the base 50 is disposed in the orifice 42 of the valve seat 40, occupying a central portion of the orifice 42. Accordingly after shut off of the fuel cell system 10 and as the water remaining in the anode loop 20 is caused to freeze as a result of a low temperature environment, a formation of ice is on the portion of the base 50 disposed in the orifice 42 and along a periphery of the orifice 42 between the base 50 and the valve seat 40. Thus, the base 50 militates against the formation of ice across the entire orifice 42.

At startup of the fuel cell system 10, when warm-up of the fuel cell 12 is typically desired, the switch 70 is closed by the controller 33, as illustrated in FIG. 3. When the switch 70 is closed by the controller 33, the electrical current is permitted to flow from the power source 66 to the solenoid 32. Consequently, the coil 62 is energized to generate magnetic fluxes which flow from the coil 62 to the moveable member 44 and then back to the coil 62 creating a magnetic force. The magnetic force causes the movable member 44 to move towards the coil 62 against the resilient force of the return mechanism 64. Thus, the collar 48 of the movable member 44 is displaced from the valve seat 40 and the base 50 is positioned away from the orifice 42, thereby permitting the flow of the fuel through the valve 30. Because the base 50 militates against the formation of ice across the entire orifice 42 when the valve 30 is closed, any ice that had formed on the elongate portion 49 and the base 50, and along the periphery of the orifice 42 as a result of the water remaining in the anode loop 20 is easily overcome by displacement of the base 50 from the orifice 42. Thus, the valve 30 minimizes the electrical current (i.e. energy) and a time required to bring the valve 30 to a normal operating condition versus employing a heater to melt the ice as is commonly known.

While certain representative embodiments and details have been shown for purposes of illustrating the invention, it will be apparent to those skilled in the art that various changes may be made without departing from the scope of the disclosure, which is further described in the following appended claims.

The invention claimed is:

1. A valve for a fuel cell system, comprising:
a valve housing including a valve seat formed therein, the valve seat having an orifice formed therein to permit a fluid to flow through the valve housing, an edge of the valve seat curved adjacent the orifice;
a movable member disposed in the valve housing and linearly movable between an open position and a closed position, the movable member seated on the valve seat and sealing the orifice in the closed position, wherein at least a portion of the movable member defines a conical shaped base having a diameter less than a diameter of the orifice, the base disposed in the orifice to militate against a formation of ice across the orifice of the valve seat when the movable member is in the closed position and a portion of the base curved, wherein the curved edge of the valve seat and the curved portion of the base facilitate slideable contact between the movable member and the valve seat; and
a bearing bracket formed with the valve seat to limit at least one of a degree of tilt and a lateral movement of the movable member, wherein the bearing bracket has a cross member spaced apart from the valve seat, the cross member having an aperture concentrically aligned with the orifice of the valve seat and receiving the portion of the movable member, the aperture having a diameter less than a diameter of the orifice, the portion of the movable member contacting an inner surface of the aperture when one of a maximum allowable degree of tilt and a maximum lateral movement of the movable member is reached.

2. The valve according to claim 1, wherein the movable member includes a first end having the conical shaped base, a second end, and a collar formed intermediate the first end and the second end.

3. The valve according to claim 1, further comprising an actuator operatively coupled to the movable member for facilitating a movement of the movable member between the open position and the closed position.

4. The valve according to claim 3, wherein the actuator is a solenoid.

5. A valve for a fuel cell system, comprising:
a valve housing including a valve seat formed therein, the valve seat having an orifice formed therein to permit a fluid to flow through the valve housing, an edge of the valve seat curved adjacent the orifice; and
a movable member disposed in the valve housing and movable between an open position and a closed position, the movable member seated on the valve seat and sealing the orifice in the closed position, the movable member including a first end, a second end, and a collar disposed intermediate the first end and the second end, the first end having a conical shaped base having a diameter less than a diameter of the orifice and an elongate portion which is rod-shaped, the conical shaped base disposed in the orifice of the valve seat when the movable member is in the closed position, a portion of the base curved, wherein the curved edge of the valve seat and the curved portion of the base facilitate slideable contact between the movable member and the valve seat, wherein the elongate, and rod-shaped portion has a diameter proportional to a diameter of the orifice and a length that permits the elongate, rod-shaped portion to remain in the orifice of the valve seat when the movable member is in the open position, and wherein a fluid tight seal is formed between the collar and the valve seat when the movable member is in the closed position.

6. The valve according to claim 5, wherein the base is positioned away from the orifice of the valve seat when the movable member is in the open position so as to not interfere with a flow of the fluid through the orifice.

7. The valve according to claim 5, wherein the base is disposed between the collar and the elongate, and rod-shaped portion.

8. The valve according to claim 5, wherein the base of the movable member is formed from a softer material than the valve seat of the valve housing.

9. The valve according to claim 5, further comprising a bearing bracket formed with the valve seat to limit a degree of tilt or lateral movement of the movable member, wherein the bearing bracket has a cross member spaced apart from the valve seat, the cross member having an aperture concentrically aligned with the orifice of the valve seat and receiving the portion of the movable member, the aperture having a diameter less than a diameter of the orifice, the portion of the movable member contacting an inner surface of the aperture when one of a maximum allowable degree of tilt and a maximum lateral movement of the movable member is reached.

10. The valve according to claim 5, wherein at least a portion of the second end of the movable member is formed from a magnetic metallic material.

11. The valve according to claim 5, further comprising an actuator operatively coupled to the movable member for facilitating an axial movement of the movable member within the valve housing.

12. The valve according to claim 11, wherein the actuator is a solenoid.

13. A valve for a fuel cell system, comprising:
a valve housing including a valve seat formed therein, the valve seat having an orifice formed therein to permit a fluid to flow through the valve housing, an edge of the valve seat curved adjacent the orifice; and
a movable member disposed in the valve housing and linearly movable between an open position and a closed position, the movable member seated on the valve seat and sealing the orifice in the closed position, the movable member including a first end, a second end, and a collar disposed intermediate the first end and the second end, the first end having a rod-shaped elongate portion and a generally conical shaped base having a diameter less than a diameter of the orifice, the generally conical shaped base disposed between the rod-shaped elongate portion and the collar, wherein the base is positioned away from the orifice of the valve seat when the movable member is in the open position so as to not interfere with a flow of the fluid through the orifice, the base disposed in the orifice of the valve seat when the movable member is in the closed position to militate against a formation of ice across the orifice of the valve seat, a portion of the base curved, wherein the curved edge of the valve seat and the curved portion of the base facilitate slideable contact between the movable member and the valve seat, wherein the rod-shaped elongate portion has a length that permits the rod-shaped elongate portion to remain in the orifice of the valve seat when the movable member is in the open position, and wherein a fluid tight seal is formed between the collar and the valve seat when the movable member is in the closed position.

14. The valve according to claim 13, wherein a diameter of the elongate portion is proportional to a diameter of the orifice of the valve seat to obtain a desired effective flow factor of the fluid through the orifice.

15. The valve according to claim 13, further comprising a bearing bracket formed with the valve seat to limit at least one of a degree of tilt and a lateral movement of the movable member, wherein the bearing bracket has a cross member spaced apart from the valve seat, the cross member having an aperture concentrically aligned with the orifice of the valve seat and receiving the portion of the movable member, the aperture having a diameter less than a diameter of the orifice, the portion of the movable member contacting an inner surface of the aperture when one of a maximum allowable degree of tilt and a maximum lateral movement of the movable member is reached.

16. The valve according to claim 13, wherein at least a portion of the second end of the movable member is formed from a magnetic metallic material.

17. The valve according to claim 13, further comprising an actuator operatively coupled to the second end of the movable member for facilitating an axial movement of the movable member within the valve housing.

* * * * *